INVENTOR
JOSEPH JAFFE
BY Roy H. Davies
ATTORNEY

United States Patent Office 3,663,424
Patented May 16, 1972

3,663,424
HYDROTREATING CATALYST COMPRISING AN INTERSTRATIFIED CRYSTALLINE CLAY-TYPE ALUMINOSILICATE COMPONENT AND A CRYSTALLINE ZEOLITIC MOLECULAR SIEVE COMPONENT, AND PROCESS USING SAID CATALYST
Joseph Jaffe, Berkeley, Calif., assignor to Chevron Research Company, San Francisco, Calif.
Continuation-in-part of application Ser. No. 750,283, Aug. 5, 1968. This application Dec. 19, 1969, Ser. No. 886,726
Int. Cl. C01b 33/28; C10g 13/04, 37/00
U.S. Cl. 208—59    21 Claims

ABSTRACT OF THE DISCLOSURE

A catalyst comprising an interstratified synthetic crystalline aluminosilicate cracking component and a crystalline zeolitic molecular sieve component, which may be dispersed in a matrix comprising a siliceous gel, if desired one or both of said components being substantially in the ammonium or hydrogen form and substantially free of any catalytic metal or metals when dispersed in a matrix, and if desired one of said components being substantially in the ammonium or hydrogen form and substantially free of any catalytic metal or metals when not dispersed in a matrix, and at least one hydrogenating component selected from rhenium and compounds thereof and Group VIII metals and compounds thereof, and processes using said catalyst.

RELATED APPLICATIONS

Figure 1:
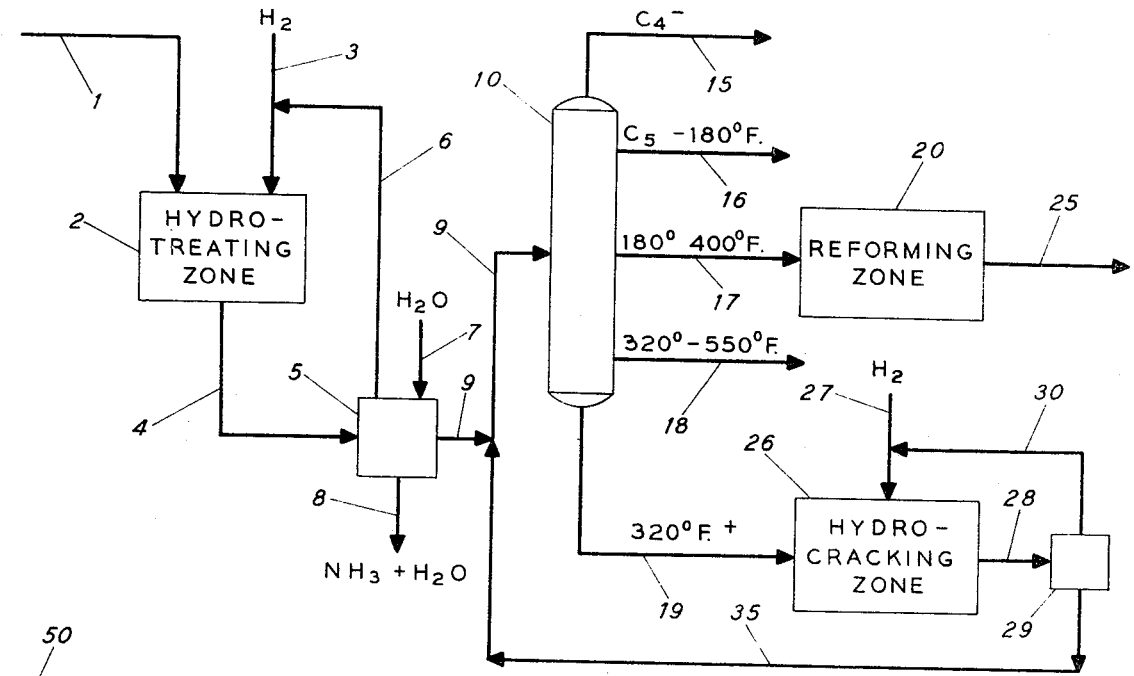

This application is a continuation-in-part of Joseph Jaffe application Ser. No. 760,513, filed Sept. 30, 1968, now abandoned, for "Hydrotreating Catalyst Comprising a Layered Crystalline Clay-Type Aluminosilicate Component and a Crystalline Zeolitic Molecular Sieve Component, and Process Using Said Catalyst," which in turn was a continuation-in-part of Joseph Jaffe application Ser. No. 752,588 for "Hydrotreating Catalyst and Process," filed Aug. 14, 1968, now abandoned, which in turn was a continuation-in-part of Joseph Jaffe application Ser. No. 750,283 for "Hydrotreating Catalyst and Process," filed Aug. 5, 1968, now U.S. Pat. 3,546,094, issued Dec. 8, 1970.

INTRODUCTION

This invention relates to catalytic hydrocracking of petroleum distillates and solvent-deasphalted residua to produce high-value fuel products, including jet fuels and gasoline.

PRIOR ART

It is known that a catalyst may comprise a crystalline zeolitic molecular sieve component associated with other catalyst components. It is also known that at least some of said other catalyst components may be in the form of a matrix in which the molecular sieve component is dispersed. It is also known that such catalysts may be used for such reactions as catalytic cracking, hydrocracking, and hydrodesulfurization. Representative prior art patents disclosing one or more of the foregoing matters include: U.S. Pat. 3,140,251; U.S. Pat. 3,140,253; British Pat. 1,056,301; French Pat. 1,503,063; French Pat. 1,506,793.

There has been a continuing search for further improvements in such catalysts, and in similar multicomponent catalysts, particularly for hydrocracking and hydrofining uses.

A crystalline zeolitic molecular sieve cracking component, while relatively insensitive to organic nitrogen compounds and ammonia, has a well-ordered ad uniform pore structure as a result of the crystal structure having bonds that are substantially equally strong in three dimensions. This provides definite limitations on the access of reactant molecules to the interior of the pores. Further, most catalysts containing crystalline zeolitic molecular sieve components cause cracking, for example hydrocracking, to occur in a manner that results in high yields of gasoline but relatively poor yields of middle distillates such as jet fuels.

Accordingly, it would be reasonable to expect that when middle distillates, for example jet fuels, are the desired primary product of a hydrocracking process, a catalyst not containing a molecular sieve cracking component should be selected.

One class of materials that could be considered as a cracking component of a hydrocracking catalyst in lieu of a crystalline zeolitic molecular sieve comprises the clays, or phyllosilicates, which are clay-type aluminosilicates. These materials are crystalline in form and, contrary to the crystalline zeolitic molecular sieves, have pores elongated in two directions. Some of these materials have the ability to expand upon the addition of a liquid. Some of them have cracking activity, or can be activated, as by acid treatment, to impart cracking activity to them. Natural clays have differing properties and combinations of properties, for example:

|   |   | Expandable | Cracking activity [1] |
|---|---|---|---|
| A | Allophane | | |
| B | Kaolin | | √ |
| C | Smectite | √ | √ |
| D | Illite | | |
| E | Chlorite | | |
| F | Vermiculite | √ | |
| G | Attapulgas | | |

Natural clays can be complex combinations from more than one category in the above list. For example, they can comprise an expandable component and a non-expandable component, a component with good cracking activity and one having relatively low cracking activity, etc.

Synthetic clays also can be produced which are analogous to natural clays in the above categories, and synthetic clays also can be complex combinations from more than one category in the above list.

It is impossible to predict with any reasonable accuracy which natural or synthetic clays in the many possible categories and combinations of categories will be operable as a component of a hydrocracking catalyst to produce various possible desired results. If the hydrocracking result desired is the production of high yields of jet fuel, one skilled in the art reasonably could conclude that he should select a catalyst not containing a crystalline zeolitic molecular sieve cracking component. However, he is left with an extensive array of other choices, including amorphous silica-alumina gels, treated and untreated natural clays in many categories, treated and untreated synthetic clays in many categories, etc. Assuming that one skilled in the art would choose to reject amorphous silica-alumina as the only cracking component in the desired catalyst, and would choose to try to make a catalyst containing a natural or synthetic clay that would produce high yields of jet fuel, he would find that some of the clays have activity that is far too low to be acceptable. He also owuld find that hydrocracking catalysts that contained some clays that might have acceptable activities would have poor stabilities if they contained certain hydrogenating components or combinations thereof. That is, he would find that such catalysts would lose their activities at an unacceptably fast rate during hydrocracking service.

In view of the foregoing, it would be desirable if a hydrocracking catalyst were available that contained a clay-type cracking component with high activity capable of cracking a hydrocarbon feedstock to produce a total liquid product containing a high proportion of jet fuel boiling range materials. It would also be desirable for such a catalyst to have a high stability, that is, a low fouling rate in hydrocracking service. It further would be desirable if such a catalyst had a high degree of tolerance for organic nitrogen compounds in the feedstock, and if it could be tailored, by adjustment of proportions of various components thereof, to produce middle distillates, particularly jet fuels, and gasolines in different ratios.

OBJECTS

Accordingly, objects of the present invention include providing an improved hydrocracking catalyst containing a clay-type cracking component that has, compared with similar prior art catalysts:

(1) High hydrocracking activity;
(2) Improved hydrocracking selectivity, particularly for the production of middle distillates, including jet fuels;
(3) High nitrogen tolerance;
(4) High hydrocracking stability;
(5) Improved amenability to being tailored, by adjustment of the ratio of different components, to produce middle distillates, particularly jet fuels, and gasolines in different ratios.

Further objects of the present invention include provision of a hydrocracking process using said improved catalyst, that is capable of producing excellent-quality jet fuel and other valuable fuel products.

The present invention will best be understood, and further objects and advantages thereof will be apparent, from the following description when read in connection with the accompanying drawing.

DRAWING

In the drawing, FIG. 1 is a diagrammatic illustration of apparatus and flow paths suitable for carrying out the process of several of the embodiments of the present invention, wherein the catalyst of the present invention is used on a once-through basis to hydrocrack a hydrocarbon feedstock to produce more valuable products, some of which may be further upgraded by catalytic reforming or catalytic hydrocracking, if desired.

Figure 2:
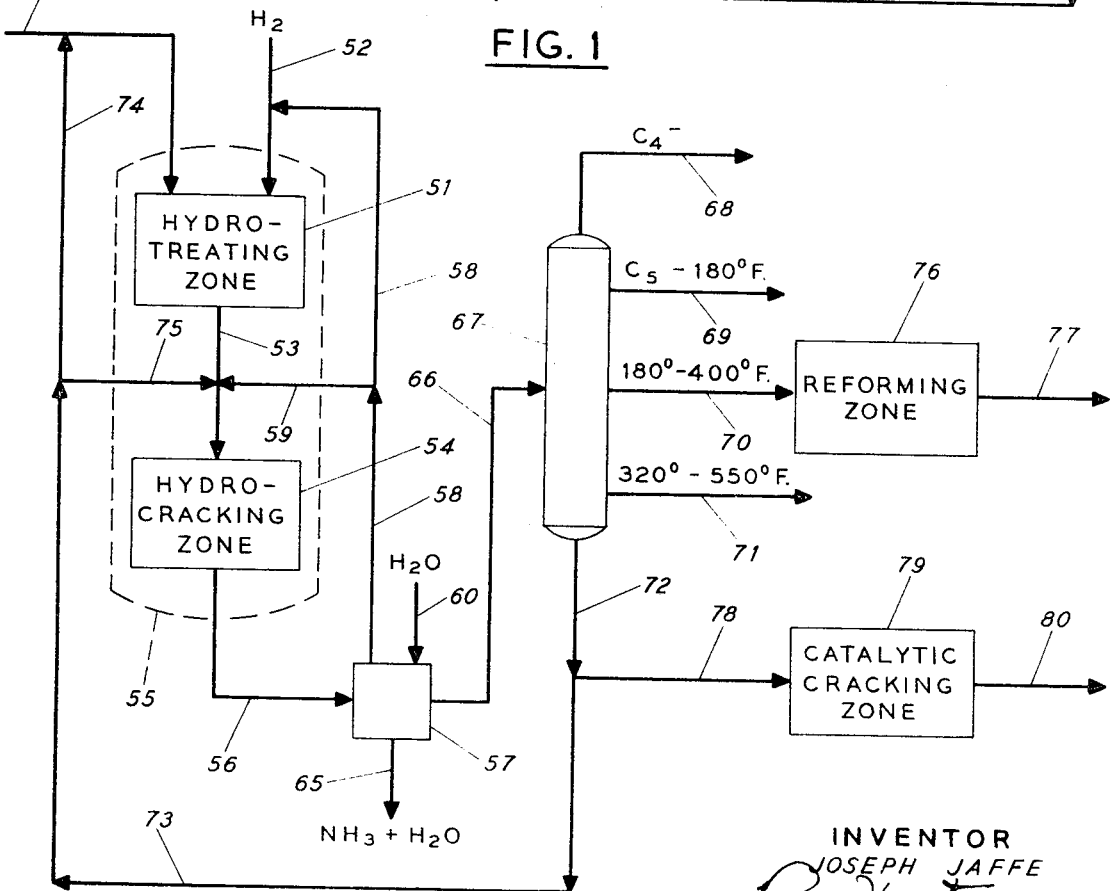

FIG. 2 is a diagrammatic illustration of apparatus and flow paths suitable for carrying out the process of additional embodiments of the present invention, wherein the catalyst of the present invention is used to hydrocrack a hydrocarbon feedstock, wherein the hydrocracking zone may be operated on a recycle basis, and wherein certain portions of the effluent from the hydrocracking zone may be catalytically reformed or catalytically cracked, as desired.

STATEMENT OF INVENTION

In accordance with the present invention, it has been found that (a) to produce high hydrocracking yields of middle distillates, particularly jet fuels, with a hydrocracking catalyst containing a clay-type cracking component, and (b) to obtain high catalyst stability during hydrocracking service, the hydrocracking catalyst must:

(1) Contain a crystalline clay cracking component of a very specific type, namely one which (a) is a synthetic crystalline aluminosilicate,
(b) is in the form of interstratified materials, or materials in mixed layers, said materials being clays from two different clay categories, namely the smectite and illite categories,
(c) has an alkali metal cation content in the range 0–0.5 wt. percent, on an anhydrous clay basis,
(d) has a content of fluorine, in combined form, in the range 0–3 wt. percent, preferably 0–2.5 wt. percent, and more preferably 0.5–2.5 wt. percent, on an anhydrous clay basis;

(2) Contain a crystalline zeolitic molecular sieve cracking component; and
(3) Contain at least one hydrogenating component selected from the group consisting of rhenium and compounds of rhenium and Group VIII metals and compounds thereof.

Said crystalline clay cracking component containing mixed layers of clays from the smectite and illite categories may be, for example, prior to drying and calcining the catalyst in which it is contained, a randomly interstratified synthetic montmorillinite-mica mineral of the type described in Granquist U.S. Pat. 3,252,757. The synthetic mineral described in that patent has the empirical formula

$$nSiO_2:Al_2O_3:mAB:xH_2O$$

where the layer lattices comprise said silica, said alumina, and said B, and where $n$ is from 2.4 to 3.0,
$m$ is from 0.2 to 0.6,
A is one equivalent of an exchangeable cation having a valence not greater than 2, and is external to the lattice,
B is chosen from the group of negative ions which consists of $F^-$, $OH^-$, $½O^{--}$ and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 A. to an upper limit of about 12.0 A. when A is monovalent, to about 14.7 A. when A divalent, and to a value intermediate between 12.0 A. and 14.7 A. when A includes both monovalent and divalent cations. The equivalent of an exchangeable cation, A, in said mineral may be chosen from the group consisting of $H^+$, $NH_4^+$, $Li^+$, $K^+$, $½Ca^{++}$, $½Mg^{++}$, $½Sr^{++}$, and $½Ba^{++}$, and mixtures thereof. Said synthetic mineral is known from U.S. Pat. 3,252,889 to have application in the dried and calcined form as a component of a catalytic cracking catalyst, and applications of said synthetic mineral in the dried and calcined form as a component of a hydrocracking catalyst have been disclosed in my copending appilcation Ser. No. 750,283 for "Hydrotreating Catalyst and Process," filed Aug. 5, 1968. By "dried and calcined form" is meant the mineral form resulting from drying and calcining the catalyst in which it is contained, which form may be different from the form of the mineral defined by the foregoing formula.

When the catalyst of the present invention does not comprise a matrix, as discussed below, one of said crystalline cracking components may be substantially in the ammonium or hydrogen form and may be substantially free of any catalytic loading metal or metals.

In particular embodiments, the catalyst of the present invention further comprises a matrix comprising a siliceous gel and said hydrogenating component, and said crystalline clay component and said crystalline molecular sieve component are in particulate form and are dispersed through said matrix. At least one of said crystalline components may be substantially in the ammonium or hydrogen form and may be substantially free of any catalytic loading metal or metals.

A particular embodiment of the catalyst of the present invention is a catalyst comprising:

(a) a gel matrix comprising a silica-alumina gel and at least one hydrogenating component selected from the group consisting of rhenium, Group VIII metals, and compounds of Group VIII metals,
(b) an interstratified smectite-illite aluminosilicate component in particulate form, and
(c) a crystalline zeolitic molecular sieve in particulate form;
said interstratified aluminosilicate component and said molecular sieve component being dispersed through said gel matrix.

Preferably, the catalyst of the present invention will be further characterized by an average pore diameter below 100 angstroms and a surface area above 200 square meters per gram, when it includes a matrix comprising a silica-alumina gel.

The catalyst of the present invention, whether or not it includes a matrix comprising a silica-alumina gel, may comprise a component selected from the metals Ag, Cu, Sn, Ti, Zr, Th, Hf, Cr, Mo, W, V, Mn, alkaline earth metals Mg, Ca, Sr and Ba, rare earth metals having atomic numbers 57–71, and compounds of said metals. When said catalyst includes a matrix comprising a silica-alumina gel, said component may be present in said matrix in an amount of 0.1 to 10 weight percent, preferably 0.5 to 9 weight percent, of said matrix, calculated as metal.

Said Group VIII component may be, for example, nickel, cobalt, platinum or palladium, in the form of the metal, oxide, sulfide or any combination thereof. When said catalyst does not include a matrix comprising a silica-alumina gel, said Group VIII component when used in said catalyst may be present therein in an amount of 0.1 to 15 weight percent, calculated as metal and based on the total of said interstratified aluminosilicate and crystalline zeolitic molecular sieve components. When said catalyst includes a matrix comprising a silica-alumina gel, said Group VIII component when used in said catalyst may be present therein in an amount of 0.1 to 15 weight percent, preferably 0.1 to 10 weight percent, calculated as metal and based on said matrix. When said Group VIII component is nickel or cobalt or compounds thereof, preferably it will be present in said catalyst comprising a silica-alumina gel matrix in an amount of at least 5 weight percent, calculated as metal and based on said matrix. Platinum or palladium or compounds thereof when used in said catalyst will be present in lesser amounts than nickel or cobalt or compounds thereof.

When said catalyst does not include a matrix comprising a silica-alumina gel, said Group VI component when used in said catalyst may be present therein in an amount of 0.1 to 20 weight percent, preferably 0.5 to 10 weight percent, calculated as metal and based on the total of said interstratified aluminosilicate and crystalline zeolitic molecular sieve components. When said catalyst includes a matrix comprising a silica-alumina gel, said Group VI component when used in said catalyst may be present therein in an amount of 0.1 to 25 weight percent, preferably 0.5 to 20 weight percent, calculated as metal and based on said matrix.

When rhenium or a compound thereof is used in said catalyst, it may be present in an amount equivalent to the amounts indicated above for Group VIII metals and compounds thereof.

Said catalyst advantageously may contain tin or a compound thereof, particularly when it also contains nickel or a compound thereof, regardless of whether said catalyst includes a matrix comprising a silica-alumina gel. The tin or compound thereof may be present in said catalyst in an amount of 0.5 to 30 weight percent, preferably 2 to 15 weight percent, based on the total catalyst and calculated as metal, when said catalyst includes a matrix comprising a silica-alumina gel. When said catalyst does not include a matrix comprising a silica-alumina gel, the tin or compound thereof may be present in an amount of 0.2 to 15 weight percent, based on the total catalyst and calculated as metal. When tin or a compound thereof is present, particularly in conjunction with nickel or a compound thereof, both the hydrocracking activity and the hydrogenation activity of said catalyst are higher, compared with the same catalyst with no tin or tin compound present. Further, when tin or a compound thereof is present, particularly in conjunction with nickel or a compound thereof, the hydrogenation activity of the catalyst can be controlled in an essentially reversible manner by varying the amount of sulfur present in the hydrocarbon feed.

Said interstratified aluminosilicate is present in said catalyst in an amount of 5 to 99 weight percent of said composite. Said crystalline zeolitic molecular sieve component is present in said catalyst in an amount of 1 to 70 weight percent, based on the total catalyst. At higher ratios of interstratified aluminosilicate to molecular sieve, higher ratios of middle distillates to gasoline will be produced, and vice versa.

Another particular embodiment of the catalyst of the present invention is a catalyst comprising:

(A) A gel matrix comprising:

(a) 5 to 85 weight percent, preferably 15 to 70 weight percent, silica, (b) 10 to 94 weight percent, preferably 30 to 85 weight percent, alumina, (c) at least one Group VIII component in the form of metal, oxide, sulfide or any combination thereof, in an amount of 0.1 to 15 weight percent, preferably 0.1 to 10 weight percent, of said matrix, calculated as metal, (d) at least one Group VI component selected from chromium, molybdenum and tungsten, in the form of metal, oxide, sulfide or any combination thereof, in an amount of 0.1 to 25 weight percent, preferably 0.5 to 20 weight percent, of said matrix, calculated as metal;

(B) An interstratified smectite-illite aluminosilicate (which may be substantially in the ammonium or hydrogen form, substantially free of any catalytic loading metal or metals), said interstratified aluminosilicate further being in particulate form and being dispersed through said matrix;

(C) A crystalline zeolitic molecular sieve (which may be substantially in the ammonium or hydrogen form, substantially free of any catalytic loading metal or metals), said molecular sieve further being in particulate form and being dispersed through said matrix.

Another particular embodiment of the catalyst of the present invention is a catalyst comprising:

(A) A porous xerogel comprising:

(a) 5 to 85 weight percent, preferably 15 to 70 weight percent, silica, (b) 10 to 94 weight percent, preferably 30 to 85 weight percent, alumina, (c) nickel, in the form of metal, oxide, sulfide or any combination thereof, in an amount of 1 to 10 weight percent, preferably 5 to 9 weight percent, of said xerogel, calculated as metal, (d) tungsten, in the form of metal, oxide, sulfide or any combination thereof, in an amount of 5 to 25 weight percent, preferably 10 to 20 weight percent, of said xerogel, calculated as metal, (e) titanium oxide, in an amount of 1 to 10 weight percent, preferably 5 to 9 weight percent, of said xerogel, calculated as metal;

(B) An interstratified smectite-illite aluminosilicate, in an amount of 5 to 99 weight percent of said catalyst, said interstratified aluminosilicate preferably being substantially in the ammonium or hydrogen form, and preferably being substantially free of any catalytic loading metal or metals, said interstratified aluminosilicate further being in the form of particles, said particles being dispersed through said xerogel;

(C) A crystalline zeolitic molecular sieve, in an amount of 1 to 70 weight percent of said catalyst, said molecular sieve preferably being substantially in the ammonium or hydrogen form, and preferably being substantially free of any catalytic loading metal or metals, said molecular sieve further being in the form of particles, said particles being dispersed through said xerogel; said catalyst having an average pore diameter below 100 angstroms and a surface area above 200 square meters per gram.

Still further in accordance with the present invention, mers is provided a hydrotreating process which comprises contacting a hydrocarbon feed containing substantial amounts of materials boiling above 200° F. and selected from the group consisting of petroleum distillates, solvent-deasphalted petroleum residua, shale oils and coal tar distillates, in a reaction zone with hydrogen and the catalyst described above, at hydrotreating conditions including a temperature in the range 400° to 950° F., a pressure in the range 800 to 3500 p.s.i.g., a liquid hourly space velocity in the range 0.1 to 5.0 and a total hydrogen supply rate of 200 to 20,000 s.c.f. of hydrogen per barrel of feedstock, and recovering hydrotreated products from said reaction zone. The hydrocarbon feed may contain a substantial amount of organic nitrogen, because the catalyst of the present invention is extremely tolerant of organic nitrogen as well as of ammonia. The catalyst, particularly when it contains both Group VI and Group VIII hydrogenating components, is an efficient hydrodenitrification catalyst, will accomplish hydrodenitrification and hydrocracking concurrently and efficiently, and may be used as a hydrodenitrification catalyst in a zone preceding a hydrocracking zone containing a similar or different hydrocracking catalyst. A superior jet fuel product may be produced when the catalyst is used for hydrocracking a suitable feedstock. A superior feedstock for a catalytic reformer also may be produced when the catalyst is used for hydrocracking. The hydrocracking zone effluent boiling above the gasoline boiling range, or boiling above the jet fuel boiling range when a jet fuel product is being recovered, may be catalytically cracked to produce additional valuable products.

The reference to an interstratified aluminosilicate component or a molecular sieve component "substantially free of any catalytic loading metal or metals" means that the component in question contains less than 0.1 weight percent noble metals, and less than 0.5 weight percent of total catalytic metal or metals, based on that component. The catalytic metal or metals include rhenium, tin, and the Group VI and VIII metals. If desired, the interstratified aluminosilicate component or the molecular sieve component, or both, may be loaded with 0.1 to 10 weight percent, based on said interstratified aluminosilicate and/or molecular sieve component or components, of a polyvalent, non-catalytic ion selected from Mn, Ti, Zr, Hf, Th, rare earths having atomic numbers 57–71, and alkaline earths Mg, Ca, Sr and Ba, while still keeping the component so loaded substantially free of any catalytic loading metal or metals.

It will be noted that the weight ratio of catalytic metal in the matrix portion of the catalyst to catalytic metal in the interstratified aluminosilicate and molecular sieve portions of the catalyst is high, in the catalyst embodiments which include a matrix comprising a silica-alumina gel, in which is dispersed an interstratified aluminosilicate substantially free of any catalytic loading metal or metals and a molecular sieve substantially free of any catalytic loading metal or metals.

In addition to the 0.3 wt. percent fluorine content of the crystalline clay cracking component of the catalyst of the present invention, other catalyst components present also may contain fluorine, in combined form, in an amount of 0–5 wt. percent of said other components. For example, when the catalyst comprises a gel matrix, said matrix may contain 0–5 wt. percent combined fluorine. The fluorine may be incorporated into the catalyst in any convenient manner that will result in a substantially uniform distribution of combined fluorine on or through the other catalyst components. A preferred manner of incorporating the fluorine in the catalyst is by the addition of a soluble fluoride compound, for example sodium fluoride, ammonium fluoride, ammonium bifluoride or hydrofluoric acid. The fluoride compound may be combined with the other catalyst components at any of various stages of catalyst preparation. When the catalyst includes a matrix comprising a siliceous gel, the fluoride compound may be formed with the matrix as a component thereof.

HYDROCARBON FEEDSTOCKS

The feedstocks supplied to the hydrocracking zone in the process of the present invention are selected from the group consisting of petroleum distillates, solvent - deasphalted petroleum residua, shale oils and coal tar distillates. The feedstocks contain substantial amounts of materials boiling above 200° F., preferably substantial amounts of materials boiling in the range 350° to 950° F., and more preferably in the range 400° to 900° F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. The feedstocks need not be subjected to a prior hydrofining treatment before being hydrocracked in the process of the present invention when the catalyst of the present invention comprises a Group VI as well as a Group VIII hydrogenating component, and particularly when it further comprises a silica-alumina gel matrix. When such an embodiment of the catalyst of the present invention is used, feedstocks may contain as high as several thousand parts per million organic nitrogen (although preferably the organic nitrogen content will be less than 1000 parts per million organic nitrogen), and also may contain several weight percent organic sulfur.

CATALYST COMPRISING AN INTERSTRATIFIED ALUMINOSILICATE COMPONENT AND A MOLECULAR SIEVE COMPONENT, AND PREPARATION THEREOF

(A) General

The interstratified aluminosilicate used in preparing the hydrocracking catalyst may be any synthetic catalytically active interstratified smectite - illite aluminosilicate, although the synthetic interstratified aluminosilicate of Granquist U.S. Pat. 3,252,757 is preferred. The sodium content of the interstratiled aluminosilicate should be below 0.5 weight percent, calculated as metal, on an anhydrous interstratified aluminosilicate basis.

The crystalline zeolitic molecular sieve component of the catalyst may be of any type that is known in the art as a useful component of a hydrocracking catalyst. A decationized molecular sive is preferred. The sodium content of the molecular sieve should be below 5 weight percent, calculated as metal. Especially suitable are faujasite, particularly Y type and X type faujasite, and mordenite, in the ammonium form, hydrogen form, alkaline earth-exchange form, or rare earth-exchanged form. An ultrastable form of molecular sieve may be used, that is, one having a sodium content below about 3 weight percent, calculated as Na$_2$O, a unit cell size below about 24.65 angstroms, and a silica/alumina ratio above about 2.15.

(B) METHOD OF PREPARATION WHEN CATALYST DOES NOT INCLUDE A MATRIX COMPRISING A SILICEOUS GEL

When the catalyst does not include a matrix comprising a siliceous gel, the hydrogenating components may be added to the interstratified aluminosilicate and molecular sieve components in any convenient manner, as by impregnation, adsorption or ion exchange, using suitable hydrogenating component percursor compounds, for example nitrates.

(C) METHOD OF COMBINING INTERSTRATIFIED ALUMINOSILICATE AND MOLECULAR SIEVE COMPONENTS WITH MATRIX WHEN CATALYST INCLUDES A MATRIX COMPRISING A SILICEOUS

When the catalyst includes a matrix comprising a siliceous gel, the interstratified aluminosilicate component and the molecular sieve component may be dispersed therein by cogelation of the matrix around said interstratified aluminosilicate component and said molecular sieve component in a conventional manner.

The desired hydrogenating components may be included in the matrix during preparation thereof, in the form of suitable precursor compounds, for example chlorides.

The interstratified aluminosilicate and molecular sieve components, substantially in the ammonium or hydrogen form, may be maintained substantially free of any catalytic loading metal or metals, in accordance with a preferred embodiment of the present invention, by dispersing them in a slurry of the percursors of the siliceous gel matrix at a pH of 5 or above. When sodium forms of interstratified aluminosilinate and molecular sieve are starting materials, they may be converted to the ammonium or hydrogen form by ion exchange prior to being combined with the other catalyst components. Alternatively, they may be combined with the other catalyst components and then converted to the ammonium or hydrogen form by ion exchange. In either case, the interstratified aluminosilicate and molecular sieve components should not be combined with the percursors of the other catalyst components at a pH below 5, if catalytic metal loading is to be avoided.

(D) Drying and activation

The catalyst following preparation in the aforesaid manner is dried in a conventional manner, and then desirably is activated in an oxygen-containing gas stream for 0.25 to 48 hours at 900° to 1600° F., preferably 0.25 to 48 hours at 900° to 1300° F. The oxygen-containing gas stream, which may be air, preferably is as dry as practicable. The improved results obtainable by activation in the indicated manner are optimized as the gas stream becomes extremely dry; although for most practical purposes the gas stream need be only as dry as ambient air, greater dryness is preferred. Those skilled in the art will be aware of various methods for drying the gas stream to any desired extent.

(E) Sulfiding

The finished catalyst may be sulfided in a conventional manner prior to use, if desired. If not presulfided, the catalyst will tend to become sulfided during process operation from any sulfur content that may be present in the hydrocarbon feed.

OPERATING CONDITIONS

The hydrocracking zone containing the catalyst of the present invention is operated at a temperature in the range 400° to 950° F., preferably 500° to 850° F., a pressure in the range 800 to 3500 p.s.i.g., preferably 1000 to 3000 p.s.i.g., a liquid hourly space velocity in the range 0.1 to 5.0, preferably 0.5 to 5.0, and more preferably 0.5 to 3.0. The total hydrogen supply rate (makeup and recycle hydrogen) to said zone is 200 to 20,000 s.c.f., preferably 2000 to 20,000 s.c.f. of hydrogen per barrel of hydrocarbon feedstock.

The operating conditions in the reforming zone and catalytic cracking zone employed in various embodiments of the present invention are conventional conditions known in the art.

PROCESS OPERATION WITH REFERENCE TO DRAWING

Referring now to FIG. 1 of the drawing, in accordance with one embodiment of the present invention, a hydrocarbon feedstock as previously described, which in this case may boil above 400° F. and which may contain a substantial amount of organic nitrogen compounds, is passed through line 1 into hydrofining-hydrocracking zone 2, which contains an embodiment of the catalyst of the present invention that includes a matrix comprising a silica-alumina gel, a Group VI hydrogenating component and a Group VIII hydrogenating component. The feedstock is hydrocracked in hydrocracking zone 2 at conditions previously described, in the presence of hydrogen supplied through line 3. Under these conditions, concurrent hydrodenitrification takes place to the extent that the feedstock is substantially denitrified. The effluent from zone 2 is passed through line 4 to separation zone 5, from which hydrogen separated from the treated feedstock is recycled through line 6 to zone 2. In zone 5, water entering through line 7 is used to scrub ammonia and other contaminants from the incoming hydrocarbon stream, and the ammonia, water and other contaminants are withdrawn from zone 5 through line 8. From zone 5, the scrubbed, hydrocracked materials are passed through line 9 to distillation column 10, where they are separated into fractions, including a $C_4$-fraction which is withdrawn through line 15, a $C_5$-180° F. fraction which is withdrawn through line 16, a 180°–400° F. fraction which is withdrawn through line 17, a 320°–550° F. fraction which is withdrawn through line 18, and a 320° F.+ fraction which is withdrawn through line 19. The $C_5$-180° F. fraction withdrawn through line 16 is a superior-quality light gasoline. The 180°–400° F. fraction withdrawn through line 17 is a superior catalytic reforming feedstock, which may be catalytically reformed in reforming zone 20, from which a superior catalytic reformate may be withdrawn through line 25. The 320°–550° F. fraction withdrawn through line 18 is a superior-quality jet fuel. The 320° F.+ fraction withdrawn through line 19 is a superior hydrocracking feedstock, which may be catalytically hydrocracked in hydrocracking zone 26 in the presence of a conventional hydrocracking catalyst and in the presence of hydrogen supplied to zone 26 through line 27. From hydrocracking zone 26, an effluent may be withdrawn through line 28, hydrogen may be separated therefrom in separator 29, and hydrogen may be recycled to hydrocracking zone 26 through line 30. Alternatively, said 320° F.+ fraction may be catalytically cracked in a catalytic cracking zone under conventional catalytic cracking conditions. From separator 29, hydrocracked materials may be passed through line 35 and 9 to distillation column 10, where they may be separated into fractions, as previously described.

Referring now to FIG. 2, a hydrocarbon feedstock as previously described, which in this case may boil above 400° F. and which may contain substantial amounts of organic nitrogen compounds, is passed through line 50 to hydrofining-hydrocracking zone 51, containing the same embodiment of the catalyst of the present invention as discussed in connection with FIG. 1. The feedstock is concurrently hydrofined and hydrocracked in zone 51 at conditions previously described in the presence of hydrogen supplied through line 52. The effluent from zone 51 may be passed through line 53 into hydrocracking zone 54, where it may be hydrocracked under the same conditions as used in zone 51, in the presence of a hydrocracking catalyst. The hydrocracking catalyst in zone 54 may be the same catalyst as used in zone 51, or may be a conventional hydrocracking catalyst comprising a crystalline zeolitic molecular sieve cracking component or a silica-alumina gel cracking component. If the catalyst in zone 54 is the same catalyst as in zone 51, or if it comprises either an interstratified alumino-silicate cracking component or a crystalline zeolitic molecular sieve cracking component, rather than both of said components, the effluent from zone 51 may be passed through line 53 into zone 54 without intervening impurity removal. If the hydrocracking catalyst in zone 54 does not contain an interstratified alumino-silicate or a molecular sieve component, it is preferred that interstage removal of ammonia and other impurities be accomplished between zones 51 and 54. Zones 51 and 54 may be located in separate reactor shells, which may be operated at different pressures. Alternatively, zones 51 and 54 may be separate catalyst beds located in a single pressure shell 55, and the effluent from zone 51 may be passed to zone 54 without intervening pressure letdown, condensation or impurity removal, particularly in the case where zone 54 contains the catalyst of the present invention or a conventional catalyst comprising a crystalline zeolitic molecular sieve component. The effluent from zone 54 is passed through line 56 to separation zone 57, from which hydrogen is recycled through line 58 to hydrofining-hydrocracking zone 51. All or a portion of the recycled hydrogen may be passed through line 59 to hydrocracking zone 54, if desired. In separation zone 57, water entering through line 60 is used to scrub ammonia and other contaminants from the incoming hydrocarbon stream, if these contaminants previously have not been removed between zones 51 and 54, and the ammonia, water and other contaminants are withdrawn from zone 57 through line 65. The effluent from zone 57 is passed through line 66 to distillation column 67, where it is separated into fractions, including a $C_4$-fraction which is withdrawn through line 68, a $C_5$-180° F. fraction which is withdrawn through line 69, a 180°–400° F. fraction which is withdrawn through line 70, a 320°–550° F. fraction which is withdrawn through line 71, and a 320° F.+ fraction which is withdrawn through line 72. The fraction withdrawn through line 72 may be recycled through lines 73 and 74 to hydrofining-hydrocracking zone 51, and this is a preferred manner of operation. All or a portion of the fraction in line 73 may be recycled to hydrocracking zone 54 through line 75, if desired. The $C_5$-180° F. fraction withdrawn through line 69 is a superior-quality light gasoline. The 180°–400° F. fraction withdrawn through line 70 is a superior catalytic reforming feedstock, which may be catalytically reformed in reforming zone 76, from which a superior catalytic reformate may be withdrawn through line 77. The 320°–550° F. fraction withdrawn through line 71 is a superior-quality jet fuel. All or a portion of the 320° F.+ fraction withdrawn through line 72 may be passed through line 78 to catalytic cracking zone 79, where it may be catalytically cracked under conventional catalytic cracking conditions in the presence of a conventional catalytic cracking catalyst to produce valuable fuel products, which may be withdrawn from zone 79 through line 80.

EXAMPLES

The following examples are given for the purpose of further illustrating the catalyst of the present invention, the preparation thereof, and the use thereof in the process of the present invention. The examples are not intended to limit the scope of the present invention.

Example 1

A cogelled catalyst (Catalyst A) of the following composition was prepared:

| Component— | Wt. percent of total catalyst |
|---|---|
| NiO | 9.2 |
| $WO_3$ | 22.7 |
| $TiO_2$ | 7.2 |
| $Al_2O_3$ | 27.0 |
| $SiO_2$ | 23.9 |
| Interstratified aluminosilicate | 10.0 |
| Total | 100.0 |

The catalyst was prepared by the following steps, using sufficient quantities of the various starting materials to produce the above-indicated weight percentages of the components of the final catalyst:

(1) An aqueous acidic solution was prepared, containing $AlCl_3$, $TiCl_4$, $NiCl_2$ and acetic acid;

(2) Three alkaline solutions were prepared: (1) a sodium silicate solution; (2) a sodium tungstate solution; and (3) an ammonia solution containing sufficient excess ammonia so that upon combining the alkaline solutions with the acidic solution coprecipitation of all of the metal-containing components of the solutions would occur at a neutral pH of about 7.

(3) The acidic and alkaline solutions were combined, and coprecipitation of all of the metal-containing components of the solutions occurred at a pH of about 7, resulting in a slurry.

(4) An interstratified smectite-illite synthetic crystalline clay-type aluminosilicate in finely divided form was added to the slurry.

(5) The interstratified aluminosilicate-containing slurry was filtered to produce an interstratified aluminosilicate-containing hydrogel filter cake, which was washed repeatedly with dilute ammonium acetate solution, to remove sodium and chloride ionic impurities from both the hydrogel and the interstratified alumino-silicate contained therein.

(6) The interstratified aluminosilicate-containing hydrogel was dried in an air-circulating oven and then was activated in flowing air for 5 hours at 950° F.

The finished catalyst was characterized by a surface area of 384 m.²/g., a pore volume of 0.4 cc./g., and an average pore diameter of 42 angstroms, and an interstratified aluminosilicate component substantially free of catalytic metals; that is, substantially all of the nickel, tungsten and titanium contained in the catalyst was located in the gel portion of the catalyst rather than in the interstratified aluminosilicate component thereof.

Example 2

A comparison cogelled catalyst (Catalyst B) was prepared exactly as in Example 1, except that a Linde sodium Y crystalline zeolitic molecular sieve component in finely divided form was used instead of an interstratified aluminosilicate, and prior to incorporation in the slurry the molecular sieve was presoaked in an ammoniacal solution of $NiCl_2$, to load the molecular sieve with nickel. The amounts of starting materials were selected to provide a final catalyst containing the same weight percentages of components as the catalyst of Example 1.

The catalyst thus differed from the catalyst of Example 1 only in that it contained a molecular sieve component instead of an interstratified aluminosilicate component, and the nickel contained in the catalyst was located both in the gel component and in the molecular sieve component.

Example 3

A cogelled catalyst (Catalyst C) of the following composition is prepared:

| Component— | Wt. percent of total catalyst |
|---|---|
| NiO | 9.2 |
| $WO_3$ | 22.7 |
| $TiO_2$ | 7.2 |
| $Al_2O_3$ | 27.0 |
| $SiO_2$ | 23.9 |
| Interstratified aluminosilicate | 5.0 |
| Crystalline zeolitic molecular sieve, Y form | 5.0 |
| Total | 100.0 |

The catalyst is prepared by the following steps, using sufficient quantities of the various starting materials to produce the above-indicated weight percentages of the components of the final catalyst:

(1) An aqueous acidic solution is prepared, containing $AlCl_3$, $TiCl_4$, $NiCl_2$ and acetic acid;

(2) Three alkaline solutions are prepared: (1) a sodium silicate solution; (2) a sodium tungstate solution; and (3) an ammonia solution containing sufficient excess ammonia so that upon combining the alkaline solutions with the acidic solution coprecipitation of all of the metal-containing components of the solutions will occur at a neutral pH of about 7.

(3) The acidic and alkaline solutions are combined, and coprecipitation of all of the metal-containing components of the solutions occurs at a pH of about 7, resulting in a slurry.

(4) An interstratified smectite-illite synthetic crystalline clay-type aluminosilicate and a sodium Y crystalline zeolitic molecular sieve component, both in finely divided form, are added to the slurry.

(5) The slurry is filtered to produce a hydrogel filter cake containing the interstratified aluminosilicate and the molecular sieve. The filter cake is washed repeatedly with dilute ammonium acetate solution, to remove sodium and chloride ionic impurities from the hydrogel and from the interstratified aluminosilicate and molecular sieve components contained therein.

(6) The hydrogel is dried in an air-circulating oven and then is activated in flowing air for 5 hours at 950° F.

The finished catalyst is characterized by a surface area of about 400 m.$^2$/g., a pore volume of about 0.4 cc./g., and an average pore diameter of about 40 angstroms, and interstratified aluminosilicate and molecular sieve components substantially free of catalytic metals; that is, substantially all of the nickel, tungsten and titanium contained in the catalyst is located in the gel portion of the catalyst rather than in the interstratified aluminosilicate and molecular sieve components thereof.

Example 4

A cogelled catalyst (Catalyst D) was prepared exactly as in Example 1, except that no interstratified aluminosilicate component or molecular sieve component was incorporated therein. The amounts of starting materials were selected to provide a final catalyst with the same proportions of non-interstratified aluminosilicate components as the catalyst of Example 1. The composition of the final catalyst was:

| Component— | Wt. percent of total catalyst |
|---|---|
| NiO | 10.2 |
| WO$_3$ | 25.2 |
| TiO$_2$ | 8.0 |
| Al$_2$O$_3$ | 30.0 |
| SiO$_2$ | 26.6 |
| Total | 100.0 |

It will be noted that the weight percentage of each non-interstratified aluminosilicate component and/or non-molecular sieve component of Catalysts A, B and C is 90% of the weight percentage of the same component of Catalyst D, the additional 10 weight percent of Catalysts A, B and C being contributed by the interstratified aluminosilicate component and/or the molecular sieve component.

Example 5

Portions of Catalysts A, B and D of Examples 1, 2 and 4, respectively, were separately used to hydrocrack separate portions of a California gas oil feedstock, on a once-through basis.

The gas oil feedstock had the following characteristics:

| Boiling range, ° F. | 500–900 |
|---|---|
| Gravity, ° API | 19 |
| Organic nitrogen content, p.p.m. | 3000 |

The hydrocracking conditions were:

| Total pressure, p.s.i.g. | 2500 |
|---|---|
| Total hydrogen rate, s.c.f./bbl. | 10,000 |
| Liquid hourly space velocity, v./v./hr. | 0.8 |
| Per-pass conversion to products boiling below 550° F., vol. percent | 60 |
| Starting temperature, ° F.—As indicated. | |

The hydrocracking activities of the three catalysts, as measured by the starting temperatures necessary to achieve the indicated per-pass conversion, were:

| Catalyst— | Starting T, ° F. |
|---|---|
| A | 751 |
| B | 751 |
| D | 773 |

The 300°–550° F. jet fuel boiling range product in each case was of the same adequate quality, in that in each case the smoke point was 21 mm. and the freeze point was below —94° F.

From this example, it appears that: (1) the interstratified aluminosilicate-containing and molecular sieve-containing gel catalysts (Catalysts A and B) have hydrocracking activity superior to that of a catalyst (Catalyst D) that does not contain an interstratified aluminosilicate component or a molecular sieve component but that is otherwise identical; and (2) the gel catalyst (Catalyst A) containing a non-metal-loaded interstratified aluminosilicate component has hydrocracking activity equal to that of a gel catalyst (Catalyst B) that is identical except that contains a metal-loaded molecular sieve component and no interstratified aluminosilicate component.

Example 6

Catalyst C is used to hydrocrack another portion of the gas oil feedstock used in Example 5, at the same conditions. The hydrocracking activity is the same as that of Catalysts A and B, that is, a starting temperature of 751° F. is necessary to achieve a 60 volume percent per-pass conversion to products boiling below 550° F. The 300°–500° F. jet fuel boiling range product is of the same quality as the jet fuel product of Example 5.

Example 7

The runs of Example 5, using Catalysts A and B, were continued, except at a per-pass conversion of 70 volume percent to products boiling below 550° F. The yield of 300°–550° F. jet fuel was as follows:

| | 300°–550° F. jet fuel yield, volume percent |
|---|---|
| Catalyst A | 55 |
| Catalyst B | 45.7 |

From this example, it appears that the catalyst comprising an interstratified aluminosilicate (Catalyst A) had a markedly superior selectivity for the production of jet fuel than a similar catalyst (Catalyst B) containing a crystalline zeolitic molecular sieve component rather than an interstratified aluminosilicate component.

Example 8

The run of Example 6 is continued, except at a per-pass conversion of 70 volume percent to products boiling below 550° F. The yield of 300°–550° F. jet fuel is 50 volume percent.

From this example it appears that the presence of both an interstratified aluminosilicate component and a molecular sieve component in the catalyst of the present invention results in a jet fuel yield intermediate between that produced by two other catalysts that are identical, except that one contains only one of said components, and the other contains only the other of said components. It is apparent that by appropriate selection of the ratio of interstratified aluminosilicate weight to molecular sieve weight in the catalyst of the present invention, the ratio of middle distillate (particularly jet fuel) yield to gasoline yield can be varied over a significant range.

Example 9

A catalyst consisting of manganese, palladium, and an interstratified clay-type smectite-illite crystalline aluminosilicate (Catalyst E, a comparison catalyst) was prepared in t he following manner:

These starting materials were used:

(1) 500 grams of an interstratified synthetic crystalline aluminosilicate mineral as described in Granquist U.S. Pat. 3,252,757;

(2) An aqueous solution containing 1250 cc. water and sufficient tetra ammino palladium dinitrate

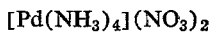

[Pd(NH$_3$)$_4$](NO$_3$)$_2$ and manganese nitrate [Mn(NO$_3$)$_2$] solution to produce a finished catalyst containing 0.5% of each metal, based on the interstratified aluminosilicate mineral.

The mineral, in powder form, was mixed with the aqueous solution to form a pasty mass. The pasty mass was dried and calcined at 950° F. in flowing air. The calcined catalyst contained 0.5 weight percent palladium, calculated as the metal and based on the cracking component, and contained 0.5% manganese, calculated as metal and based on the cracking component.

Example 10

A commercial catalyst consisting of 0.5 weight percent palladium on a crystalline zeolitic molecular sieve was calcined at 950° F. in flowing air (Catalyst F, a comparison catalyst).

Example 11

A catalyst consisting of: (a) an interstratified layered clay-type crystalline aluminosilicate mineral loaded with manganese and palladium; and (b) a crystalline zeolitic molecular sieve substantially free of hydrogenating metals (Catalyst G, a catalyst of the present invention) was prepared in the following manner.

These starting materials were used:

(1) 500 grams of an interstratified synthetic crystalline aluminosilicate mineral as described in Granquist U.S. Pat. 3,252,757;

(2) An aqueous solution containing 1250 cc. water and sufficient tetra ammino palladium dinitrate

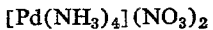

[Pd(NH$_3$)$_4$](NO$_3$)$_2$ and manganese nitrate [Mn(NO$_3$)$_2$] solution to produce a finished catalyst containing 0.5% of each metal, based on the aluminosilicate mineral;

(3) 75 grams of a low-sodium crystalline zeolitic molecular sieve.

The clay-type mineral, in powder form, was mixed with the aqueous solution to form a pasty mass. The pasty mass was dried and crushed to a powder. This dried powder was thoroughly mixed with the dry zeolitic molecular sieve. This final composite was tabletted and calcined in flowing air at 950° F. The calcined catalyst contained 0.5 weight percent palladium, calculated as the metal and based on the clay-type mineral, and contained 0.5 weight percent manganese, calculated as the metal and based on the clay-type mineral.

Example 12

Catalysts E, F and G of Examples 9, 10 and 11, respectively, were used separately to hydrocrack separate portions of a light cycle oil feedstock of the following description:

| | |
|---|---|
| Gravity, ° API | 27.6 |
| Aniline point, ° F. | 100.1 |
| Nitrogen content, p.p.m. | 0.16 |
| Boiling range, ° F. | 400–700 |

The hydrocracking was accomplished on a recycle liquid basis at 1200 p.s.i.g. and at the remaining conditions as shown.

| Catalyst | E | F | G |
|---|---|---|---|
| Test 1: Liquid hourly space velocity=1.5 Conversion below 400° F.=80% | | | |
| Activity, ° F | 538 | 577 | 510 |
| Fouling rate, ° F./hr | 0.05 | (<0.01) | <0.01 |
| Test 2: Liquid hourly space velocity=2.0 Conversion below 400° F.=80% | | | |
| Activity, ° F | | | |
| Fouling rate, ° F./hr | 0.5 | | |
| Test 3: Liquid hourly space velocity=4.0 Conversion below 400° F.=80% | | | |
| Activity, ° F | | 602 | 558 |
| Fouling rate, ° F./hr | (>1.0) | ~0.01 | (~0.01) |
| Test 4: Liquid hourly space velocity=5.0 Conversion below 400° F.=80% | | | |
| Activity, ° F | | | 571 |
| Fouling rate, ° F./hr | | | ~0.03 |

In the above table, the numbers in brackets represent estimates of the catalyst performance from additional data and interpolations. The precise level of these estimates is not highly important, as the advantages of the catalyst of the present invention would be apparent even without these estimates.

The results of Test 1 are indeed surprising. Catalyst E, a palladium-manganese-clay catalyst, exhibited excellent activity, but only marginal stability. Catalyst F, a palladium-on-zeolite catalyst, exhibited a poor activity, but high stability. However, Catalyst G, a palladium-manganese-clay catalyst containing 15% unloaded zeolite, exhibited an activity surpassing both catalysts and an excellent stability.

Test 2 demonstrates that Catalyst E has very poor stability at high space velocities. It is surprising that such a component, constituting 85% of Catalyst G, can survive the high severity conditions of Tests 3 and 4.

In Tests 3 and 4, the unusually high stability and activity of Catalyst G is demonstrated at high severities. Catalyst G is 40° F. more active than Catalyst F, a metal-loaded sieve catalyst; is of equal stability to Catalyst F; and is orders of magnitude more stable than Catalyst E.

Catalyst G represents a case wherein a favorable synergism must exist between the unloaded zeolitic molecular sieve and the metal-loaded clay. Such a synergism is impossible to predict, and is particularly surprising in that a metal-free component would be expected to foul rapidly (or Catalyst G would be expected to be the least stable catalyst) and a mixture of these components is more active than the individual metal-loaded components.

What is claimed is:

1. A hydrocarbon conversion catalyst comprising an interstratified smectite-illite crystalline clay-type aluminosilicate component, a crystalline zeolitic molecular sieve component, and at least one hydrogenating component selected from the group consisting of rhenium, compounds of rhenium, Group VIII metals and compounds of Group VIII metals.

2. A catalyst as in claim 1, wherein one of said crystalline components is substantially in the ammonium or hydrogen form, and further is substantially free of any catalytic loading metal or metals.

3. A catalyst as in claim 1, wherein said interstratified crystalline component contains 0–0.5 weight percent sodium and 0.0–3.0 weight percent fluorine, all on an anhydrous interstratified crystalline component basis.

4. A catalyst as in claim 1, which further comprises a component selected from the metals Ag, Cu, Sn, Ti, Zr, Th, Hf, Cr, Mo, W, V, Mn, alkaline earth metals Mg, Ca, Sr and Ba, rare earth metals having atomic numbers 57–71, and compounds of said metals.

5. A catalyst as in claim 1, wherein said interstratified crystalline aluminosilicate component and said crystalline molecular sieve component are in particulate form and are dispersed in a matrix comprising a siliceous gel and said hydrogenating component.

6. A catalyst as in claim 5, wherein at least one of said crystalline components is substantially in the ammonium or hydrogen form, and further is substantially free of any catalytic loading metal or metals.

7. A catalyst as in claim 5, which further comprises tin or a compound thereof.

8. A hydrocarbon conversion catalyst comprising:
(a) a gel matrix comprising a silica-alumina gel and at least one hydrogenating component selected from the group consisting of rhenium, compounds of rhenium, Group VIII metals, and compounds of Group VIII metals,
(b) an interstratified smectite-illite crystalline clay-type aluminosilicate component in particulate form, and
(c) a crystalline zeolitic molecular sieve component in particulate form;
said interstratified aluminosilicate component and said molecular sieve component being dispersed through said gel matrix.

9. A catalyst as in claim 8, wherein said matrix further comprises combined fluorine, in an amount of 0.0 to 5.0 weight percent.

10. A catalyst composite comprising:
(A) a gel matrix comprising:
(a) 5–85 weight percent silica,
(b) 10–94 weight percent alumina,
(c) a Group VIII component, in the form of metal, oxide, sulfide or any combination thereof, in an amount of 0.1 to 15 weight percent of said matrix, calculated as metal,
(d) a Group VI component selected from chromium, molybdenum and tungsten, in the form of metal, oxide, sulfide or any combination thereof, in an amount of 0.1 to 25 weight percent of said matrix, calculated as metal;
(B) an interstratified smectite-illite crystalline clay-type aluminosilicate in particulate form, dispersed through said matrix;
(C) a crystalline zeolitic molecular sieve, in particulate form, dispersed through said matrix.

11. A catalyst composite as in claim 10, wherein said interstratified crystalline aluminosilicate is present in an amount of 5 to 99 weight percent, and said molecular sieve is present in an amount of 1 to 70 weight percent, based on said composite.

12. A catalyst composite as in claim 10, wherein at least one of said crystalline components is substantially in the ammonium or hydrogen form, and is substantially free of any catalytic loading metal or metals.

13. A catalyst composite as in claim 10, wherein said gel matrix comprises nickel and tungsten, in the form of the metals, oxides, sulfides, or any combination thereof.

14. A catalyst composite as in claim 8, further comprising a component selected from the metals Ag, Cu, Sn, Ti, Zr, Th, Hf, Cr, Mo, W, V, Mn, alkaline earth metals Mg, Ca, Sr and Ba, rare earth metals having atomic numbers 57–71, and compounds of said metals.

15. A catalyst composite as in claim 14, comprising titanium in the form of titania.

16. A catalyst composite as in claim 10, characterized by an average pore diameter below 100 angstroms and a surface area above 200 square meters per gram.

17. A catalyst consisting essentially of:
(A) a porous xerogel comprising:
(a) 5 to 85 weight percent silica,
(b) 10 to 94 weight percent alumina,
(c) nickel, in the form of metal, oxide, sulfide, or any combination thereof, in an amount of 1 to 10 weight percent of said xerogel, calculated as metal,
(d) tungsten, in the form of metal, oxide, sulfide or any combination thereof, in an amount of 5 to 25 weight percent of said xerogel, calculated as metal,
(e) titanium oxide, in an amount of 0.1 to 10 weight percent of said xerogel, calculated as metal;
(B) a clay-type, interstratified smectite-illite crystalline aluminosilicate, in an amount of 5 to 99 weight percent of said catalyst, said crystalline aluminosilicate being in the form of particles, said particles being dispersed through said xerogel;
(C) a crystalline zeolitic molecular sieve, in an amount of 1 to 70 weight percent of said catalyst, said molecular sieve being in the form of particles, said particles being dispersed through said xerogel;
said catalyst having an average pore diameter below 100 angstroms and a surface area above 200 square meters per gram.

18. A hydrotreating process which comprises contacting a hydrocarbon feed containing substantial amounts of materials boiling above 200° F. and selected from the group consisting of petroleum distillates, solvent-deasphalted petroleum residua, shale oils and coal tar distillates, in a reaction zone with hydrogen and the catalyst of claim 1, at hydrotreating conditions including a temperature in the range 400° to 950° F., a pressure in the range 800 to 3500 p.s.i.g., a liquid hourly space velocity in the range 0.1 to 5.0, and a total hydrogen supply rate of 200 to 20,000 s.c.f. of hydrogen per barrel of feedstock, and recovering hydrotreated products from said reaction zone.

19. A process as in claim 18, wherein said hydrocarbon feed contains a substantial amount of organic nitrogen, and wherein ammonia is removed from the effluent from said reaction zone.

20. A process as in claim 18, wherein a gasoline product and a jet fuel product are recovered from the effluent from said reaction zone.

21. A process as in claim 20, wherein a portion of the effluent from said reaction zone boiling above the gasoline boiling range is hydrocracked in a second reaction zone in the presence of hydrogen and a hydrocracking catalyst at hydrocracking conditions including a temperature in the range 400° to 950° F., a pressure in the range 800 to 3500 p.s.i.g., a liquid hourly space velocity in the range 0.1 to 5.0, and a total hydrogen supply rate of 200 to 20,000 s.c.f. of hydrogen per barrel of feedstock, and wherein at least one hydrocracked product is recovered from said reaction zone.

References Cited
UNITED STATES PATENTS

| | | | |
|---|---|---|---|
| 3,132,087 | 5/1964 | Kelley et al. | 208—60 |
| 3,140,253 | 7/1964 | Plank et al. | 208—120 |
| 3,236,762 | 2/1966 | Rabo et al. | 208—111 |
| 3,252,757 | 2/1966 | Granquist | 208—120 |

DELBERT E. GANTZ, Primary Examiner

G. E. SCHMITKONS, Assistant Examiner

U.S. Cl. X.R.

208—60, 89, 111; 252—455 Z